United States Patent
Colotte et al.

(10) Patent No.: US 7,370,468 B2
(45) Date of Patent: May 13, 2008

(54) TURBOJET ELECTROMECHANICAL THRUST REVERSER WITH SERVO-CONTROLLED DOOR DISPLACEMENT

(75) Inventors: Baptiste Colotte, Melun (FR); Alexandre Courpied, Paris (FR); Marc Croixmarie, Auvernaux (FR); Patrick Joland, Evry Gregy sur Yerres (FR); Gilles Le Gouellec, Paris (FR); Marion Michau, Thiais (FR)

(73) Assignee: Hispano Suiza, Colombes (FR)

( * ) Notice: Subject to any disclaimer, the term of this patent is extended or adjusted under 35 U.S.C. 154(b) by 819 days.

(21) Appl. No.: 10/691,694

(22) Filed: Oct. 24, 2003

(65) Prior Publication Data
US 2004/0139726 A1  Jul. 22, 2004

(30) Foreign Application Priority Data
Oct. 25, 2002  (FR) .................................. 02 13403

(51) Int. Cl.
*F02K 1/54* (2006.01)
(52) U.S. Cl. .................... 60/226.2; 60/230; 244/110 B
(58) Field of Classification Search ............... 60/226.2, 60/230; 244/110 B
See application file for complete search history.

(56) References Cited

U.S. PATENT DOCUMENTS

| | | | |
|---|---|---|---|
| 4,543,783 A | 10/1985 | Greuene et al. | |
| 5,960,626 A | 10/1999 | Baudu et al. | |
| 6,094,908 A | 8/2000 | Baudu et al. | |
| 6,439,504 B1 | 8/2002 | Ahrendt | |
| 6,598,386 B2 * | 7/2003 | Johnson et al. | 60/226.2 |
| 6,622,474 B1 * | 9/2003 | Sternberger et al. | 60/226.2 |
| 6,684,623 B2 * | 2/2004 | Langston et al. | 60/226.2 |
| 2003/0015982 A1 * | 1/2003 | Cox-Smith et al. | 318/433 |

FOREIGN PATENT DOCUMENTS

EP  1 004 798  5/2000

OTHER PUBLICATIONS

U.S. Appl. No. 10/678,104, filed Oct. 6, 2003, Colotte et al.
U.S. Appl. No. 10/691,694, filed Oct. 24, 2003, Colotte et al.
U.S. Appl. No. 10/691,692, filed Oct. 24, 2003, Colotte et al.

* cited by examiner

*Primary Examiner*—L. J. Casaregola
(74) *Attorney, Agent, or Firm*—Oblon, Spivak, McClelland, Maier & Neustadt, P.C.

(57) ABSTRACT

A turbojet thrust reverser includes two doors each displaceable between an open position and a closed position of the reverser by at least one respective control actuator. Two electric motors drive the control actuators for the doors; each motor being controlled by an electronic control unit connected to a full authority digital engine control. Two servo-control devices control the displacement of the doors as a function of determined position references. The servo-control devices enable the doors to be displaced synchronously as a function of any variation in the forces exerted on the reverser and as a function of any force difference between the two doors.

17 Claims, 2 Drawing Sheets

TURBOJET ELECTROMECHANICAL THRUST REVERSER WITH SERVO-CONTROLLED DOOR DISPLACEMENT

BACKGROUND OF THE INVENTION

The present invention relates to the general field of thrust reversers for bypass turbojets. It relates more particularly to an electromechanical thrust reverser having at least two displaceable elements which co-operate, when the reverser is in its open position, in producing thrust reversal, such as, for example, a thrust reverser having doors, grids, or shells.

Thrust reversers fitted to bypass turbojets are well known in the field of aviation. They serve to increase aircraft safety by assisting in braking during landing. Thrust reversers are generally in the form of at least two moving elements, such as sliding doors, which are suitable for being moved relative to the pod of the turbojet by control actuators so that when operating in thrust reversal, i.e. when in the open position, they constitute an obstacle for a fraction of the gas coming from the turbojet, which fraction is diverted forwards so as to deliver reverse thrust to the airplane.

The sliding doors are generally moved by a hydraulic control system. Such a control system essentially comprises hydraulic actuators for driving the doors of the reverser, a hydraulic control unit for feeding the chambers of the control actuators with hydraulic fluid under pressure, and hydraulic circuits. The hydraulic power needed for feeding that type of control system is taken directly from the hydraulic circuit of the airplane.

While the reverser is being opened and closed, it is essential for the doors to be displaced in synchronized manner. Non-synchronized displacement of the doors generates high levels of dynamic stress on the reverser and can cause large amounts of damage to the reverser and the turbojet. Poor synchronization of door displacement results from different loadings on the doors, leading to a large difference in position between them. Furthermore, it is possible that the driving forces applied to the doors of the reverser are different. Under such circumstances, risks can arise of the reverser being distorted and thus damaged.

In order to detect any such variation in the forces exerted on a hydraulically-controlled thrust reverser and in order to detect any difference between the forces on the doors thereof, it is known to provide the control actuators with sensors measuring the pressure of the hydraulic fluid present in the chamber of the actuators. By comparing the pressure measurements taken by the various sensors, it is possible to detect both any variation in the forces exerted on the reverser, and any force difference between the doors, thus making it possible to avoid any twisting of the reverser, which would lead to a difference in position between the doors.

Thrust reverser technology using a hydraulic control system presents drawbacks associated in particular with the volume occupied by the various hydraulic circuits. Finding a path for these circuits is difficult because of the small amount of space that is available on the front frame of the reverser. Another drawback of this technology lies in using a hydraulic fluid that is dangerous since it is corrosive and flammable. In addition, the use of pressure sensors for detecting and remedying any blocking or jamming of the doors makes it impossible to be aware of how the performance of the thrust reverser is varying over time in order to be able to anticipate any degradation and/or aging thereof.

OBJECT AND SUMMARY OF THE INVENTION

The present invention thus seeks to mitigate such drawbacks by proposing a compact electromechanical thrust reverser which makes it possible to detect and remedy both any variation in the forces exerted on the reverser, and any force differences between the doors, in order to enable the displacements thereof to be synchronized accurately.

To this end, the invention provides a turbojet thrust reverser comprising two doors each displaceable between an open position and a closed position of the reverser by means of at least one respective control actuator, the reverser further comprising: two electric motors each driving the at least one control actuator for each door; each motor being controlled by an electronic control unit connected to a full authority digital engine control (FADEC); and two servo-control means for controlling the displacement of corresponding ones of the doors as a function of determined position references, the servo-control means enabling the doors to be displaced synchronously as a function of any variation in the forces exerted on the reverser and as a function of any force difference between the two doors.

The servo-control means include means for calculating variation in the forces exerted on the reverser and means for compensating the force variation. Preferably, the means for calculating force variation comprise: means for calculating the time derivatives of the speeds of rotation of each of the electric motors; means for calculating the time derivatives of the excitation currents powering each of the electric motors; and means for calculating variation in the forces exerted on the reverser on the basis of the calculated derivatives of the speeds of rotation and the excitation currents of each of the electric motors.

Thus, the servo-control means of the invention enable any variation in the forces exerted on the reverser to be detected and compensated. When such variation is detected, the invention makes it possible to compensate said variation in order to regulate the displacement speed of the doors. This compensation is performed by acting on the excitation current applied to each of the electric motors as a function of the calculated force variation.

Similarly, the servo-control means advantageously include means for calculating force differences between the two doors and means for correcting such force differences. Force differences are calculated by comparing the derivatives of the excitation current for each of the electric motors.

In this way, the servo-control means of the invention also serve to detect any force difference between the doors of the reverser in order to synchronize their displacements. A force difference can lead to risks of distortion and thus of damage to the reverser. The servo-control means enable such a difference to be corrected by acting either on the excitation current or on the speed of rotation of each of the electric motors.

BRIEF DESCRIPTION OF THE DRAWINGS

Other characteristics and advantages of the present invention appear from the following description, made with reference to the accompanying drawings which show an embodiment having no limiting character. In the figures.

DETAILED DESCRIPTION OF AN EMBODIMENT

Figure 1:
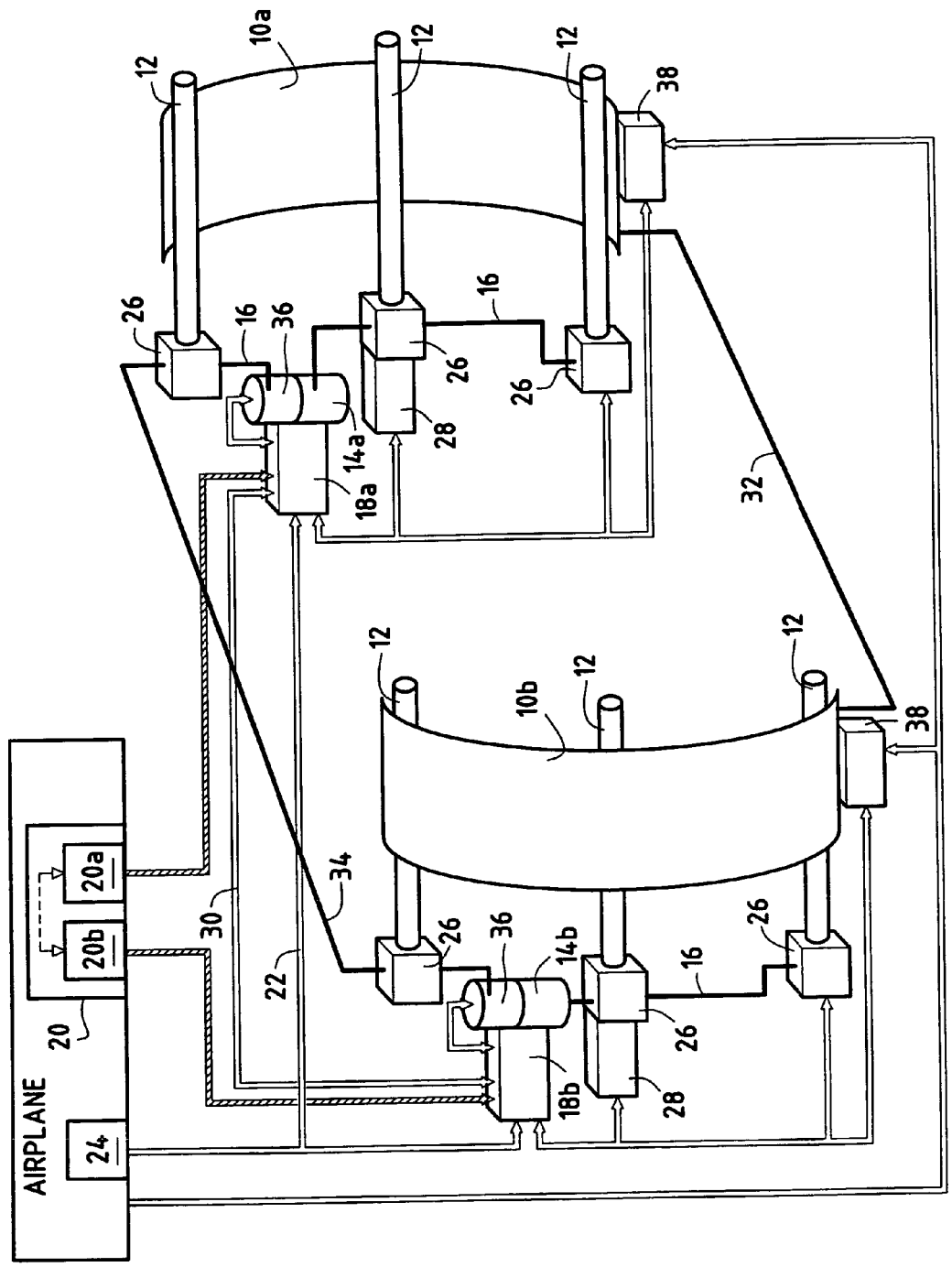
FIG. 1 is a diagram showing an embodiment of a thrust reverser of the invention.

Reference is made initially to FIG. 1 which shows an embodiment of a thrust reverser of the invention.

The thrust reverser has two doors 10a, 10b each displaceable between an open position and a closed position of the reverser by means of least one control actuator 12 (three actuators are shown in FIG. 1, a central actuator and two actuators positioned at two lateral extremities of each door).

The reverser further includes two electric motors 14a and 14b each controlling the displacement of a respective door. These electric motors drive the control actuators 12 of each of the doors 10a, 10b via transmission shafts 16 interconnecting the control actuators of each door.

Each electric motor 14a, 14b is mounted directly on an electronic control unit 18a, 18b which manages the entire displacement sequence of the two doors and regulates the speed of rotation of the electric motor. Each electronic control unit 18a, 18b is electrically connected to one of the two channels 20a, 20b of a FADEC 20 of the airplane. The order to deploy or to retract the thrust reverser is issued by the FADEC to the electronic units 18a, 18b. It is also possible to integrate the electronic unit in the FADEC itself.

Electrical power supply to the electronic control units 18a, 18b is provided via an electrical harness 22 connected to the electricity network 24 of the airplane on which the turbojet is mounted. The electronic control units transform and adapt the electrical signal in order to power the electric motors 14a, 14b.

The actuators 12 controlling the doors of the reverser are of the electromechanical type. They are driven by gearboxes 26 mounted on each of the actuators. The control relationship (speed control or on/off type control) of the doors 10a, 10b of the reverser is delivered from the electronic units to each of the control actuators 12 via the electric motors 14a, 14b, the transmission shafts 16, and the gearboxes 26.

A drive socket 28 may be provided at one of the control actuators 12 so as to enable the door associated with the control actuator to be controlled manually, in particular while performing maintenance operations on the thrust reverser. In the example shown in FIG. 1, the central actuator 12 presents such a drive socket 28 at its gearbox 26. Since the gearboxes of each door are interconnected, this socket enables an operator in charge of maintenance to open and/or close the doors of the thrust reverser using a single handle, for example. Access to the drive socket 28 of each door may be connected electrically to the electronic control unit 18a, 18b so as to deactivate electrical power supply during maintenance operations in order to avoid any untimely deployment of the reverser.

The electronic control units 18a, 18b may also exchange data between each other via a harness type electrical link 30. This exchange of data between the two electronic units makes it possible in particular to ensure that position information coming from the two doors can be compared. A mechanical link 32 between the two doors 10a, 10b and a flexible synchronizing shaft 34 interconnecting the actuators of the two doors may also be provided in order to facilitate synchronizing the displacement of the two doors.

The thrust reverser has three levels of locking, each individually capable of holding the thrust reverser.

A first level of locking is provided by a mechanical blocking device 36 referred to as a primary lock associated with each door of the reverser. Each primary lock is mounted directly on the corresponding electric motor 14a, 14b. These primary locks 36 enable the door associated therewith to be held. For example, they can be of the disk brake type or of the type performing blocking by means of a peg which prevents the transmission shaft from turning.

Given that the two doors 10a, 10b are mechanically interconnected by the links 32 and 34, the primary lock 36 of one of the doors 10a, 10b constitutes a second level of locking for the other door for which it constitutes a secondary lock. The secondary lock is designed to withstand the loading from the door in the event of the primary lock failing. Thus, if the locking device of one of the doors is considered as being the primary lock, the locking device of the other door can be considered as being the secondary lock, and vice versa.

The third level of locking is provided by an abutment locking device 38 referred to as a tertiary lock which is positioned at one lateral extremity of each door 10a, 10b or of one door only. These tertiary locks may be connected to the electronics units 18a, 18b, to the FADEC 20, and/or directly to the cockpit of the airplane. They are preferably controlled directly from the airplane cockpit in order to provide sufficient operating safety and avoid possible common modes. When connected to the FADEC or to the airplane cockpit, the tertiary locks remain operational even in the event of the electronic control units failing. They enable loading on the reverser door to be taken up in the event of the primary and the secondary locks failing.

The thrust reverser of the invention further comprises means for servo-controlling the displacement of each of the doors 10a, 10b as a function of predetermined position references. These servo-control means make it possible to ensure that door displacement is synchronized while taking account simultaneously of any variation in the forces exerted on the reverser which are sensed individually on each of the doors, and any possible difference between the forces that may exist between the two doors.

Figure 2:
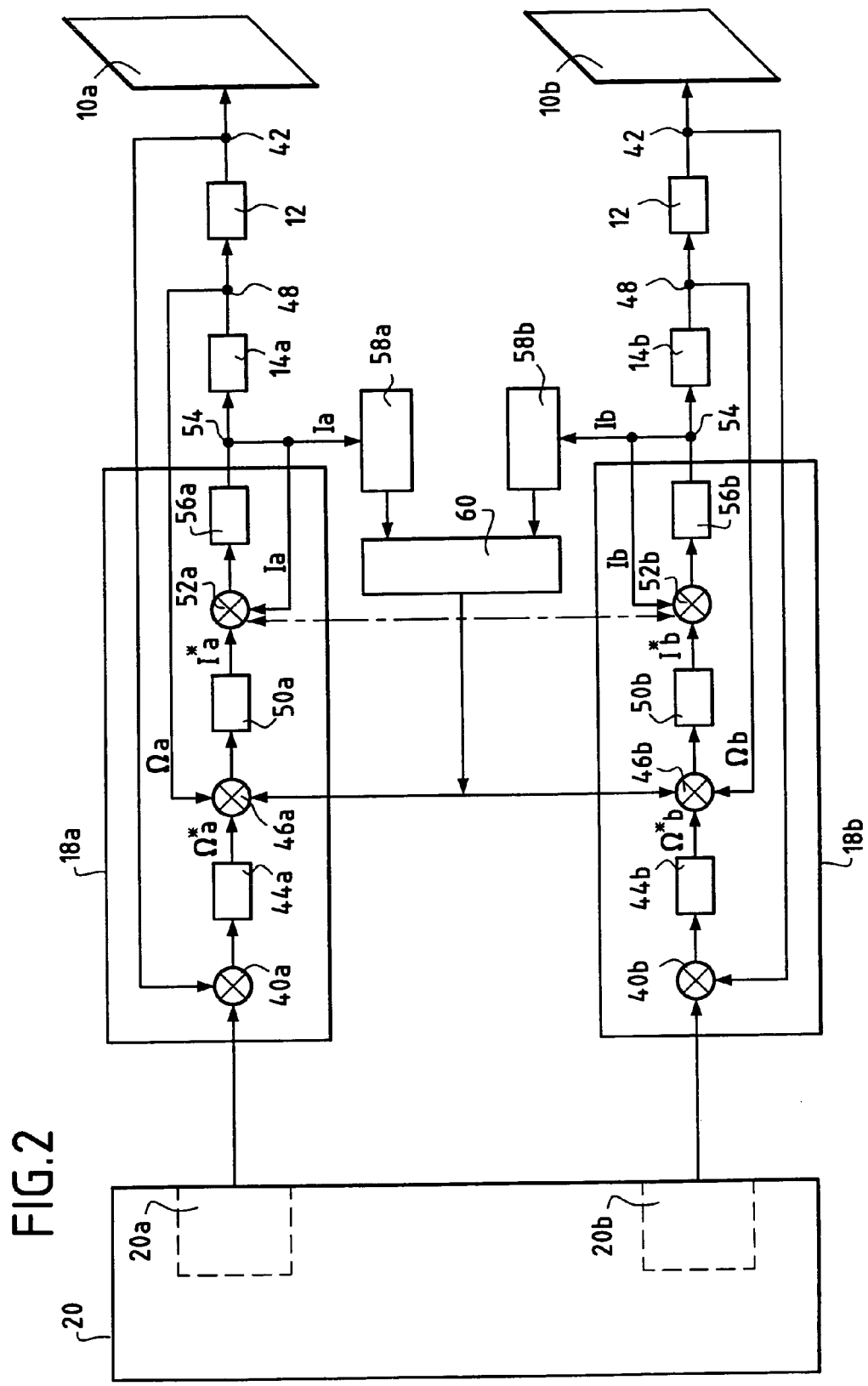
FIG. 2 is a partial block diagram relating to the embodiment of a thrust reverser shown in FIG. 1.

The forces exerted on the thrust reverser vary throughout the deployment or retraction of its doors so that the torque that needs to be delivered by each electric motor in order to overcome these forces is not constant during door displacement. These forces exerted on the reverser comprise, in particular, aerodynamic forces, friction forces, and forces due to possible degradation of the thrust reverser. The servo-control means of the invention enable any variation in these forces to be detected and enables such variation, if it exists, to be compensated. Given that the torque delivered by each electric motor is proportional to the excitation current of the motor, the servo-control means act on excitation current via a servo-control circuit, shown in detail below with reference to FIG. 2, in order to overcome the forces exerted on the reverser.

The FADEC 20 delivers an open or closed position reference to the thrust reverser via a servo-control circuit. Once this position reference has been delivered, a first comparator 40a, 40b forming part of each electronic control unit 18a, 18b analyzes the difference between the position reference issued by the FADEC 20 and the real position of each door. The real position of each door is measured, for example, by a position sensor 42 positioned at the outlet from one of the door control actuators 12.

Each electronic control unit 18a, 18b has a first corrector network 44a, 44b which delivers a reference speed of rotation $\Omega^*a$, $\Omega^*b$ for each electric motor 14a, 14b whenever there exists a difference between the reference position and the measured position of each door of the reverser.

Downstream from the first corrector network, along the servo-control circuit, a second comparator 46a, 46b serves to compare, for each electric motor 14a, 14b, the reference speed of rotation Ω*a, Ω*b as delivered by the first corrector network 44a, 44b with the real speed of rotation Ωa, Ωb as measured at an axis of rotation of each electric motor 14a, 14b. The speed of rotation Ωa, Ωb of each electric motor is measured by a resolver 48 or by a phonic wheel, for example.

When there is a difference between the reference speed Ω*a, Ω*b and the measured speed Ωa, Ωb of each electric motor, a second corrector network 50a, 50b serves to calculate the time derivative of the measured speed of rotation for each motor. This derivative of the speed is used for calculating any variation in the force exerted on the reverser.

Each second corrector network also generates a reference excitation current I*a, I*b for feeding to each electric motor 14a, 14b whenever there exists a difference between the reference position issued by the FADEC 20 and the measured position of each reverser door.

Downstream from the second corrector network 50a, 50b, along the servo-control circuit, a third comparator 52a, 52b serves to compare, for each electric motor 14a, 14b, the reference excitation I*a, I*b as generated in this way with the excitation current Ia, Ib as measured at the input of each electric motor. For example, the current-measuring means can be constituted by respective ammeter clamps 54.

When there is a difference between the reference excitation current I*a, I*b and the measured excitation current Ia, Ib, a third corrector network 56a, 56b serves to calculate the time derivative of the excitation current as measured for each motor.

On the basis of this calculated variation in excitation current it is then possible to calculate any variation in the forces exerted on the reverser. It is known that:

$$\Gamma_{motor} = J \times \left(\frac{d\Omega}{dt}\right) + \Gamma_{resist} \tag{1}$$

in which: $\Gamma_{motor}$ designates the torque delivered by each electric motor; J is a constant corresponding to the mechanical inertia of the thrust reverser as a whole; $d\Omega/dt$ is the time derivative of the speed of rotation of each electric motor; and $\Gamma_{resist}$ represents the opposing torque generated by the forces exerted on the thrust reverser.

By taking the time derivative of equation (1) in calculation means 58a, 58b, it is possible to calculate any variation in the forces exerted on the reverser (corresponding to $d\Gamma_{resist}/dt$). The time derivative of equation (1) is written as follows:

$$\frac{d\Gamma_{motor}}{dt} = J \times \left(\frac{d^2\Omega}{dt^2}\right) + \left(\frac{d\Gamma_{resist}}{dt}\right) \tag{2}$$

in which: the derivative of the motor torque ($d\Gamma_{motor}/dt$) delivered by each electric motor 14a, 14b is proportional to the derivative of the measured excitation current Ia, Ib powering the motor (the derivatives of these currents are calculated by the third corrector networks 56a, 56b); the mechanical inertia J of the thrust reverser is a previously-evaluated constant; and the acceleration $d^2\Omega/dt^2$ of the electric motors is obtained by calculating the derivative of the speed in the second corrector network 50a, 50b.

Once variation in the forces exerted on the thrust reverser has been calculated in this way, it is necessary for the electric motor 14a, 14b of each door to deliver driving torque capable of overcoming such forces. Given that the torque delivered by a motor is proportional to the excitation current powering the motor, the motor is caused to deliver torque for overcoming the forces merely by applying correcting action on the excitation current. This action is calculated by the calculation means 58a, 58b and is applied to the third comparator 52a, 52b in each of the electronic control units 18a, 18b.

Furthermore, the means for servo-controlling the displacement of the doors of the reverser in accordance with the invention also detect and remedy any difference in forces between the two doors. Such a difference in forces can exist. Under such circumstances, the forces applied to the two doors are different and risks of distortion and thus of damage to the reverser can appear. It is therefore important to compare the excitation currents Ia, Ib feeding each of the electric motors 14a, 14b so as to modify the speed reference Ω*a, Ω*b or the current reference I*a, I*b applied to one of the motors in order to slow it down (or to accelerate it). This serves to reduce the position difference between the two doors and thus to facilitate synchronizing the displacement of the doors and reducing any risk of the reverser twisting.

Starting from above-mentioned equation (2), and given that the motor torque ($\Gamma_{motor}$) delivered by each electric motor is proportional to its excitation current (i.e. $I=k\times \Gamma_{motor}$), it can be deduced that the time derivative of the excitation current for each electric motor is written as follows:

$$\frac{dI}{dt} = k \times \left[J \times \left(\frac{d^2\Omega}{dt^2}\right) + \left(\frac{d\Gamma_{resist}}{dt}\right)\right] \tag{3}$$

In addition, given that the two electric motors 14a, 14b are operating at substantially the same speed of rotation in order to ensure that the doors of the reverser are displaced synchronously, it can be deduced:

$$k \times \left[J \times \left(\frac{d^2\Omega a}{dt^2}\right)\right] \approx k \times \left[J \times \left(\frac{d^2\Omega b}{dt^2}\right)\right] \tag{4}$$

Consequently, by comparing the derivatives of the excitation currents for the electric motors, the following is obtained by combining equations (3) and (4):

$$\left(\frac{dI}{dt}\right)_a - \left(\frac{dI}{dt}\right)_b \approx k \times \left[\left(\frac{d\Gamma_{resist}}{dt}\right)_a - \left(\frac{d\Gamma_{resist}}{dt}\right)_b\right]$$

in which $(d\Gamma_{resist}/dt)_a$ and $(d\Gamma_{resist}/dt)_b$ represent the variation in the forces exerted on each of the doors of the thrust reverser.

As a result, by comparing the derivatives of the excitation currents for the electric motors, it is possible to determine any force differences between the two doors of the reverser. Thus, if different forces are applied to the doors, it is possible to detect the difference. Each of the excitation current derivatives is calculated by the corresponding third corrector network 56a, 56b in each of the electronic control units 18a, 18b, and comparison is performed by a comparator 60.

When such a force difference between the two doors is detected in this way, it is necessary to exert the desired corrective action on one or both of the two doors. For example the corrective action may consist either in completely stopping the reverser system, or in reversing the doors, or in reversing the doors a few centimeters and then restarting them in the initially desired direction. Which corrective action to perform is a free choice of the pod manufacturer. It is also possible to consider continuing the movement of the doors in jerks.

The corrective action may be performed in the loop servo-controlling the speed of rotation of the electric motors via the second comparator network 46a, 46b of each electronic control unit. It may also be performed in the loop servo-controlling the excitation current of the electric motors via the third comparator network 52a, 52b (chain-dotted lines in FIG. 2).

Thus, each electronic control unit 18a, 18b presents loop regulation of the position of the corresponding door 10a, 10b, thus enabling accurate synchronization to be obtained in the displacement of the doors as a function of the reference issued by the FADEC 20, with account being taken on each occasion of any variation in the forces exerted on the reverser and of any difference of the forces between the two doors of the reverser.

In the above description of the means for servo-controlling the displacement of each of the doors, the various comparators (40a, 40b, 46a, 46b and 52a, 52b) and the various corrector networks (44a, 44b, 50a, 50b, and 56a, 56b) are implemented in the form of conventional software and the data processed by the software (speed of rotation and excitation) is processed in digital form. Similarly, the calculation means 58a, 58b and the comparator 60 for comparing the derivatives of the excitation current are implemented in software form. The use of software for servo-controlling the displacement of the doors in the present invention provides greater flexibility in implementing the loop for servo-controlling speed and excitation current.

The present invention thus presents numerous advantages, and in particular the ability to detect and remedy any possible force differences exerted on the reverser in order to avoid any twisting thereof. This function thus enables the reverser to be protected so as to preserve its integrity, particularly in the event of a problem. It is also possible, by calculating the opposing torque, to detect potential locking or jamming or thrust reverser. In addition, calculating the opposing torque reveals how the thrust reverser varies over time thus making it possible to anticipate any degradation and/or aging thereof. More generally, the present invention enables the safety of the thrust reverser to be improved.

What is claimed is:

1. A turbojet thrust reverser comprising:
   a first door displaceable between an open position and a closed position by a first control actuator unit;
   a second door displaceable between an open position and a closed position by a second actuator unit;
   a first electric motor driving said first control actuator unit, said first electric motor being controlled by a first electronic control unit connected to a full authority digital engine control; and
   a second electric motor driving said second control actuator unit, said second electric motor being controlled by a second electronic control unit connected to said full authority digital engine control;
   wherein said first electronic control unit comprises a first servo-control device configured to control the displacement of said first door as a function of determined position references;
   wherein said second electronic control unit comprises a second servo-control device configured to control the displacement of said second door as a function of said determined position references;
   wherein said first and second servo-control devices enable said first and second doors to be displaced synchronously as a function of any variation in the forces exerted on the reverser and as a function of any force difference between the first and second doors, and
   wherein each of said first and second servo-control devices include means for calculating variation in forces exerted on the reverser and means for compensating said force variation on the reverser.

2. A thrust reverser according to claim 1, wherein said means for calculating variation in forces comprise:
   means for calculating the time derivatives of the speeds of rotation of each of said first and second electric motors;
   means for calculating the time derivatives of the excitation currents powering each of said first and second electric motors; and
   means for calculating variation in the forces exerted on the reverser on the basis of said calculated derivatives of the speeds of rotation and the excitation currents of each of said first and second electric motors.

3. A thrust reverser according to claim 1, wherein said means for compensating said force variation on the reverser include means for acting on the excitation currents of each of each electric motors.

4. A turbojet thrust reverser comprising:
   a first door displaceable between an open position and a closed position by a first control actuator unit;
   a second door displaceable between an open position and a closed position by a second actuator unit;
   a first electric motor driving said first control actuator unit, said first electric motor being controlled by a first electronic control unit connected to a full authority digital engine control; and
   a second electric motor driving said second control actuator unit, said second electric motor being controlled by a second electronic control unit connected to said full authority digital engine control;
   wherein said first electronic control unit comprises a first servo-control device configured to control the displacement of said first door as a function of determined position references;
   wherein said second electronic control unit comprises a second servo-control device configured to control the displacement of said second door as a function of said determined position references;
   wherein said first and second servo-control devices enable said first and second doors to be displaced synchronously as a function of any variation in the forces exerted on the reverser and as a function of any force difference between the first and second doors, and
   wherein each of said first and second servo-control devices include means for calculating a force difference between the first and second doors, and means for correcting said force difference.

5. A thrust reverser according to claim 4, wherein said means for calculating said force difference between the first and second doors comprise:

means for calculating time derivatives of the excitation currents feeding each of said first and second electric motors;

means for comparing said derivatives of the excitation currents of said first and second electric motors; and means for calculating said force difference on the basis of said comparison of the derivatives of the excitation currents of the electric motors.

6. A thrust reverser according to claim 4, wherein said means for correcting the force difference comprise means for acting on the excitation current or on the speed of rotation of each of said first and second electric motors.

7. A thrust reverser according to claim 2, wherein the first and second servo-control devices include means for measuring the speed of rotation of each of the first and second electric motors and means for measuring the excitation current feeding each of said first and second electric motors.

8. A turbojet thrust reverser comprising:

a first door displaceable between an open position and a closed position by a first control actuator unit;

a second door displaceable between an open position and a closed position by a second actuator unit;

a first electric motor driving said first control actuator unit, said first electric motor being controlled by a first electronic control unit connected to a full authority digital engine control; and a second electric motor driving said second control actuator unit, said second electric motor being controlled by a second electronic control unit connected to said full authority digital engine control;

wherein said first electronic control unit comprises a first servo-control device configured to control the displacement of said first door as a function of determined position references;

wherein said second electronic control unit comprises a second servo-control device configured to control the displacement of said second door as a function of said determined position references;

wherein said first and second servo-control devices enable said first and second doors to be displaced synchronously as a function of any variation in the forces exerted on the reverser and as a function of any force difference between the first and second doors, and wherein the first and second servo-control devices further comprise means for generating a reference speed of rotation and a reference excitation current for each of said first and second electric motors as a function of a difference between a real position of each door and a reference position as delivered by said full authority digital engine controller.

9. A thrust reverser according to claim 8, wherein the first and second servo-control devices further comprise means for measuring the real positions of said first and second doors.

10. A turbojet thrust reverser comprising:

a first door displaceable between an open position and a closed position by a first control actuator unit;

a second door displaceable between an open position and a closed position by a second actuator unit;

a first electric motor driving said first control actuator unit, said first electric motor being controlled by a first electronic control unit connected to a full authority digital engine control; and a second electric motor driving said second control actuator unit, said second electric motor being controlled by a second electronic control unit connected to said full authority digital engine control;

wherein said first electronic control unit comprises a first servo-control device configured to control the displacement of said first door as a function of determined position references;

wherein said second electronic control unit comprises a second servo-control device configured to control the displacement of said second door as a function of said determined position references;

wherein said first and second servo-control devices enable said first and second doors to be displaced synchronously as a function of any variation in the forces exerted on the reverser and as a function of any force difference between the first and second doors, and wherein said first control actuator unit comprises three actuators, each actuator being connected to a gearbox coupled to said first electric motor; and wherein said second control actuator unit comprises three actuators, each actuator being connected to a gearbox coupled to said second electric motor.

11. A thrust reverser according to claim 1, further comprising an electric link between said first and second electronic control units and wherein said first and second electronic control units exchange data over said electric link enabling a comparison of position information for said first and second doors.

12. A turbojet thrust reverser comprising:

a first door displaceable between an open position and a closed position by a first control actuator unit;

a second door displaceable between an open position and a closed position by a second actuator unit;

a first electric motor driving said first control actuator unit, said first electric motor being controlled by a first electronic control unit connected to a full authority digital engine control; and a second electric motor driving said second control actuator unit, said second electric motor being controlled by a second electronic control unit connected to said full authority digital engine control;

wherein said first electronic control unit comprises a first servo-control device configured to control the displacement of said first door as a function of determined position references;

wherein said second electronic control unit comprises a second servo-control device configured to control the displacement of said second door as a function of said determined position references;

wherein said first and second servo-control devices enable said first and second doors to be displaced synchronously as a function of any variation in the forces exerted on the reverser and as a function of any force difference between the first and second doors, and further comprising synchronizing shaft between said first and second doors.

13. A thrust reverser according to claim 12, further comprising three locking mechanisms, each individually configured to hold the thrust reverser.

14. A thrust reverser according to claim 13, wherein two of said three locking mechanisms include a first lock mounted directly on said first electric motor and a second lock mounted directly on said second electric motor.

15. A thrust reverser according to claim 14, wherein a third of said three locking mechanisms includes an abutment locking device positioned at one lateral extremity of at least one of said first and second doors.

16. A thrust reverser according to claim 14, wherein a third of said three locking mechanisms includes an abutment locking device positioned at one lateral extremity of each of said first and second doors.

17. A thrust reverser according to claim 15, wherein said third locking mechanism remains operational even when the first or second electronic control fail.

* * * * *